US009852743B2

(12) United States Patent
Zhang et al.

(10) Patent No.: US 9,852,743 B2
(45) Date of Patent: Dec. 26, 2017

(54) AUTOMATIC EMPHASIS OF SPOKEN WORDS

(71) Applicant: ADOBE SYSTEMS INCORPORATED, San Jose, CA (US)

(72) Inventors: Yang Zhang, Urbana, IL (US); Gautham J. Mysore, San Francisco, CA (US); Floraine Berthouzoz, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/947,918

(22) Filed: Nov. 20, 2015

(65) Prior Publication Data

US 2017/0148464 A1 May 25, 2017

(51) Int. Cl.
  *G10L 21/00* (2013.01)
  *G10L 21/013* (2013.01)
  *G10L 15/18* (2013.01)
  *G10L 15/06* (2013.01)

(52) U.S. Cl.
  CPC .......... *G10L 21/013* (2013.01); *G10L 15/063* (2013.01); *G10L 15/1807* (2013.01); *G10L 15/1815* (2013.01)

(58) Field of Classification Search
  CPC .............................. G10L 13/08; G10L 21/013
  USPC .................... 704/258, 260, 266, 207; 700/94
  See application file for complete search history.

(56) References Cited

U.S. PATENT DOCUMENTS

| | | | | |
|---|---|---|---|---|
| 5,924,068 A * | 7/1999 | Richard | ................ | H04N 7/088 |
| | | | | 345/901 |
| 6,078,885 A * | 6/2000 | Beutnagel | ............. | G10L 15/063 |
| | | | | 704/231 |
| 7,401,021 B2 * | 7/2008 | Choi | ....................... | G10L 21/00 |
| | | | | 704/269 |
| 7,925,304 B1 * | 4/2011 | Gailloux | ................ | H04M 3/42 |
| | | | | 379/88.16 |
| 8,224,654 B1 * | 7/2012 | LeBeau | .................... | G10L 15/22 |
| | | | | 704/231 |
| 8,321,225 B1 * | 11/2012 | Jansche | ................. | G10L 13/027 |
| | | | | 704/258 |
| 8,571,849 B2 * | 10/2013 | Bangalore | ............ | G06F 17/289 |
| | | | | 704/10 |
| 8,923,829 B2 * | 12/2014 | Chang | ..................... | H04W 4/16 |
| | | | | 455/414.1 |
| 9,478,143 B1 * | 10/2016 | Bowen | ..................... | G09B 5/06 |
| 2003/0158721 A1 * | 8/2003 | Kato | ....................... | G10L 13/10 |
| | | | | 704/1 |

(Continued)

*Primary Examiner* — Shaun Roberts
(74) *Attorney, Agent, or Firm* — Shook, Hardy & Bacon, L.L.P.

(57) ABSTRACT

Embodiments of the present invention provide systems, methods, and computer storage media directed towards automatic emphasis of spoken words. In one embodiment, a process may begin by identifying, within an audio recording, a word that is to be emphasized. Once identified, contextual and lexical information relating to the emphasized word can be extracted from the audio recording. This contextual and lexical information can be utilized in conjunction with a predictive model to determine a set of emphasis parameters for the identified word. These emphasis parameters can then be applied to the identified word to cause the word to be emphasized. Other embodiments may be described and/or claimed.

20 Claims, 6 Drawing Sheets

(56) References Cited

U.S. PATENT DOCUMENTS

| | | | | |
|---|---|---|---|---|
| 2007/0027687 A1* | 2/2007 | Turk | ............... | G10L 21/00 |
| | | | | 704/246 |
| 2007/0033032 A1* | 2/2007 | Schubert | ............... | G10L 15/22 |
| | | | | 704/235 |
| 2007/0189128 A1* | 8/2007 | Chung | ............... | G09B 7/02 |
| | | | | 369/7 |
| 2008/0255837 A1* | 10/2008 | Kahn | ............... | G10L 25/48 |
| | | | | 704/235 |
| 2009/0299748 A1* | 12/2009 | Basson | ............... | G10L 21/02 |
| | | | | 704/270 |
| 2009/0307207 A1* | 12/2009 | Murray | ............... | G06F 17/30026 |
| 2010/0169092 A1* | 7/2010 | Backes | ............... | G06F 19/322 |
| | | | | 704/235 |
| 2011/0202345 A1* | 8/2011 | Meyer | ............... | G10L 13/033 |
| | | | | 704/260 |
| 2013/0218568 A1* | 8/2013 | Tamura | ............... | G10L 13/033 |
| | | | | 704/260 |
| 2013/0262096 A1* | 10/2013 | Wilhelms-Tricarico | | G10L 25/90 |
| | | | | 704/202 |

\* cited by examiner

AUTOMATIC EMPHASIS OF SPOKEN WORDS

BACKGROUND

Spoken content such as, for example, voiceover and narrative content, is regularly utilized to convey information to an audience. Presently, spoken content is regularly recorded for applications such as podcasts, demo videos, lecture videos, and audio stories, just to name a few. In all of these areas, having high quality speech or voice characteristics (e.g., emphasis; variety in tone, i.e., avoid being monotone; flow or speed; diction, i.e., articulation; etc.) can aid the author, or speaker, in effectively communicating the information that is attempting to be conveyed to the audience. In addition, having high quality speech or voice characteristics can help the author maintain the interest of the audience. As such, the speech or voice characteristics are an important aspect of this spoken content. Because of this, a professional with voice acting skills is generally the preferred speaker for such spoken content because of such a professional's command of these speech or voice characteristics.

In the digital age, especially with the advent of social media, spoken content is being produced more and more frequently by users who are not professionals and therefore may not have the command of speech or voice characteristics that a professional has. Up to this point, the options for a user who does not have command of these characteristics, and is recording the content themselves, have been limited to visual cues displayed through a graphical user interface that can help guide the user's spoken performance. As such, the user still needs to be able to perform in accordance with the visual cues, which may be incorrect and may actually make the performance worse. There has been very little that the user could rely on to adjust aspects of the spoken performance after recording.

SUMMARY

One of the primary speech or voice characteristics that attributes to a good performance of spoken content is appropriate emphasis of words. Embodiments of the present invention are directed at systems, methods, and computer storage media for automatically emphasizing words in spoken content. This automatic emphasis can be facilitated by generating one or more predictive models for various aspects of emphasis. These various models can include models for: pitch; duration, or tempo; and spectral balance. Each of these models can be utilized individually, or in conjunction with one another, to predict respective parameters for a spoken word based on contextual and lexical information of the spoken word within the recording. These predictive models can be utilized by a user to automatically emphasize words within spoken content.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
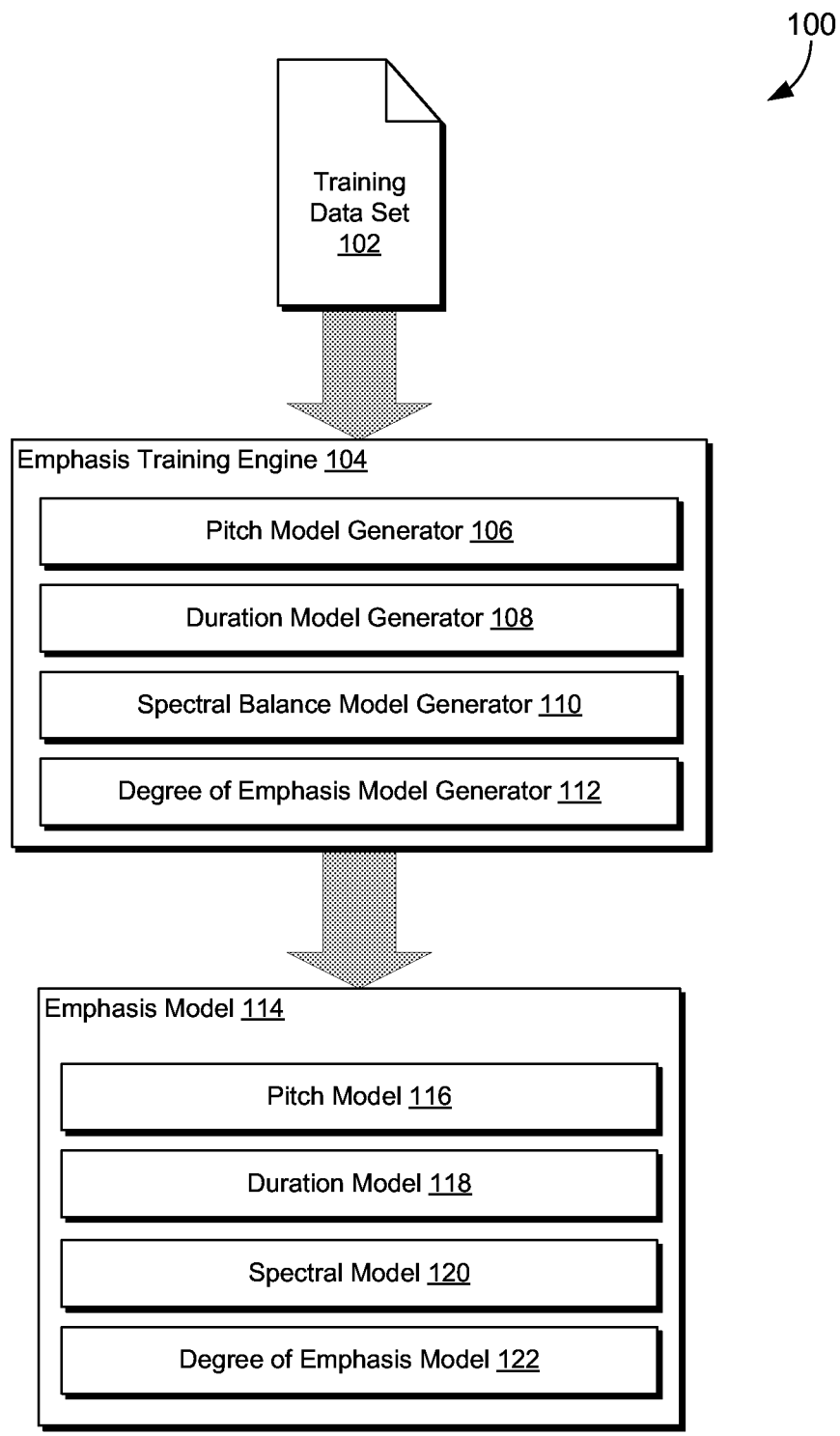
FIG. 1 depicts aspects of an illustrative training environment, in accordance with various embodiments of the present disclosure.

Spoken content is an important aspect when trying to convey information to an audience, such as, for example, through voiceover or narration. High quality spoken content can aid in both maintaining the attention of the audience as well as accurately conveying the desired information. One of the main aspects of high quality spoken content is correctly emphasizing words within the spoken content. This can be a difficult task for a speaker that is not well versed in how to properly emphasize words. While there are tools available that can visually guide a user (e.g., via a graphical user interface) in recording the spoken words, these tools typically just direct the user to speak more quickly, more slowly, or indicate words that should be emphasized by the user. As a result, these tools still require the user to understand how to properly emphasize the word.

Embodiments of the present invention are directed towards automatically adding emphasis to words within spoken content. By automatically adding emphasis to words within spoken content, the user is relieved of having to correctly emphasize the word at the outset, and can instead concentrate on the information that the user is trying to convey. In addition, by allowing the user to add emphasis to the spoken words after the recording of the spoken words, a great deal of time and effort can be saved by not continually re-recording the spoken content in an attempt to achieve the correct emphasis.

This automatic emphasis can be facilitated through the use of one or more predictive models directed at predicting respective aspects of emphasis. These aspects of emphasis can be referred to as prosody. Prosody denotes patterns of stress and intonation in a language. Prosody can include aspects of the language, such as, for example, pitch, duration (also referred to as tempo), and spectral balance. In embodiments, these predictive models are directed towards one or more of these aspects of prosody. As such, these predictive models can include respective models for each of pitch, duration, and/or spectral balance. Predictive models can be produced by analyzing a training data set that includes properly emphasized words. In some embodiments, this analysis could include a regression analysis that correlates contextual and lexical information of the emphasized words, such as that described extensively herein, with values for the aspect of prosody to which the respective model is directed. As such, each predictive model can be configured to predict respective emphasis parameters for a given word based on contextual and lexical information of the given word.

Predictive models can be utilized by a user to automatically emphasize words within spoken content. To accomplish this, the user can input an audio recording of the spoken content along with identification of those words that the user would like to be emphasized. Contextual and lexical information concerning the identified words can then be extracted from the spoken content. This contextual and lexical information can be utilized in conjunction with one or more of the predictive models to determine emphasis parameters that are applied to the identified words to adjust the perceived emphasis of the identified words within the audio recording. The application of these emphasis parameters can maintain the original pronunciation and timbre of the identified words, which yields a natural sounding emphasized word.

FIG. 1 depicts aspects of an illustrative training environment 100 in accordance with various embodiments of the present disclosure. Training environment 100 includes an emphasis training engine 104. Emphasis training engine 104 can be configured to generate various predictive models that can be utilized to predict values for various emphasis parameters including pitch, duration, and spectral balance.

To accomplish the prediction of values for any of the above mentioned emphasis parameters, emphasis training engine 104 is configured to take training data set 102 as input. Training data set 102 includes one or more audio files that include audio recordings of words that have been properly emphasized (e.g., by professional voice actors, or the like). The audio recordings could be recorded by speakers in a target accent (e.g., American English). In addition, the audio recordings could be in a target genre (e.g., radio broadcasting genre).

Training data set 102 can also include labels that identify various pieces of information with respect to the audio recordings of the training data set 102. These labels could be included as metadata within the one or more audio files of the training data set 102 or could be included as a separate data file. Labels could identify, for example, pitch accent positions and pitch accent types for each word within the audio recordings; a position and level of each break within the audio recordings ranging from word level breaks to intonational phrase boundary level breaks; and a phonetic transcription and alignment within the audio recordings. Each of these examples will now be discussed in greater detail in turn. With respect to accent positions, a pitch accent is generally used in autosegmental-metrical (AM) theory framework, hereinafter "AM framework," to refer to a set of intonational behaviors that are associated with emphasis, stress, or highlight. In accordance with tones and break indices (ToBI) transcription, pitch accent types can include a peak accent (represented by H*), a low accent (represented by L*), a scooped accent (represented by a L*+H), and a rising peak accent (represented by L+H*), among others. As an example, peak pitch accent position refers to the location in time (e.g., seconds) where the pitch reaches a peak within the word, which can be represented by H* alone, or H* and L+H* in accordance with ToBI. With respect to a level of each break, a break, as used in this context, is a period of time between words within the audio recording. A break level, or level of a break, indicates a measure for the duration of a respective break. As an example, in accordance with the AM framework, break levels between words can be represented by integer values ranging from 1-4 with larger values indicating a longer duration of the break. For example, a break level of 1 would generally correspond with the duration of a break between words, while a break level of 4 would generally correspond with an intonational phrase boundary (e.g., a break between sentences, paragraphs, etc.). With respect to the position of intonational phrase boundary breaks within the audio recordings, this refers to the locations in time (e.g., seconds) of the level 4 breaks within the audio recordings. A phonetic transcription is a representation of the phones contained within the audio recordings. As used in this context, a phone generally refers to a fundamental unit of pronunciation in a language. These fundamental units are generally either vowels or consonants. For instance, there are approximately 50 phones in American English. These approximately 50 phones can be combined to depict the pronunciation of words in American English. Of these 50 phones, approximately 26 are considered to be vowel phones. For example, the word 'spin' contains four phones and a phonetic transcription of 'spin' can be presented as [s][p][I][n]. Phonetic alignment refers to a set of time stamps marking the start and ending time (e.g., in seconds) of each phone in a given audio file. An example of such a training data set is the Boston University Radio Speech Corpus, although it will be appreciated that any suitable training data set can be utilized.

As depicted, emphasis training engine 104 is configured with model generators 106-112 directed at generating predictive models 116-122 of emphasis model 114. Each of predictive models 116-122 can be utilized for predicting emphasis parameters of a given word that is to be emphasized. These model generators include a pitch model generator 106, a duration model generator 108, a spectral balance model generator 110, and degree of emphasis model generator 112 that are configured to utilize training data set 102 to respectively generate a pitch model 116, a duration model 118, a spectral balance model 120, and a degree of emphasis model 122.

Pitch model generator 106 is configured to utilize training data set 102 to generate pitch model 116. In embodiments, pitch model generator 106 can be configured to utilize regression analysis of training data set 102 to generate pitch model 116. Regression analysis is a process of estimating relationships among variables via a variety of techniques that model and analyze the variables. These variables can be divided into two major categories: dependent variables, also referred to in the art as criterion variables; and independent variables, also referred to in the art as explanatory variables. Regression analysis can help identify how dependent variables change with respect to a change to any one of the independent variables.

In embodiments, pitch model generator 116 can be configured to generate pitch model 116 in accordance with the following equation:

$$y_p^i = F_p(x_p^i) + e_p^i. \quad \text{Equation 1}$$

In equation 1, 'i' denotes the i-th emphasized word in the training data set 102; '$y_p^i$' represents a column vector of pitch parameters (i.e., the dependent variables); '$x_p^i$' represents a column vector of contextual and lexical information (i.e., the independent variables); $F_p(\cdot)$ is a regression function; '$e_p^i$' is a residual, or error, term accounting for impact of unknown factors as well as inaccuracy in the form of the regression function, and the subscript 'p' refers to pitch.

The column vector of pitch parameters represented by $y_p^i$ in equation 1 can generally be referred to as dependent variables in regression analysis. The pitch parameters can be selected to approximate a pitch contour of each emphasized word in the training data set 102. As used herein, a pitch contour tracks pitch over time. Illustrative pitch contours are depicted in graph 500 of FIG. 5. The pitch parameters can include, for example, a peak pitch level, or maximum pitch, of an emphasized word in the audio recording. As such, the peak pitch level is indicative of the pitch level of the stressed syllable of the emphasized word. Such a peak pitch level can be indicated, for example, in semitones, or any other suitable measurement. As another example, these pitch parameters can, additionally or alternatively, include a peak time which indicates when the peak pitch level is reached. The peak time can be indicated in any time measurement, such as, for example, seconds or milliseconds, from the beginning, of the stressed syllable. In some embodiments, the peak time can be normalized by the duration of the stressed syllable. As another example, the pitch parameters can, additionally or alternatively, include a pitch starting level for the emphasized word. The pitch starting level indicates the pitch level at the onset, or beginning, of the emphasized word. Such a pitch starting level can be indicated, for example, in semitones, or any other suitable measurement. As yet another example, the pitch parameters can, additionally or alternatively, include pitch ending level. The pitch ending level indicates the pitch level at the end of the emphasized word. Such a pitch ending level can be indicated, for example, in semitones, or any other suitable measurement. These pitch parameters can be identified via the labels of the training data set 102. It will be appreciated that these are merely meant to be examples of possible pitch parameters and that other pitch parameters can be included without departing from the scope of this disclosure.

The column vector of contextual and lexical information represented by '$x_p^i$' in equation 1 can generally be referred to as independent variables, or explanatory variables, in regression analysis. As used throughout this disclosure, lexical information can also include phonetic information. These explanatory variables can include, for example, break levels of the breaks immediately preceding the word and immediately following the word. As another example, these explanatory variables can include, additionally or alternatively, the number of phones that occur within the word before and after the stressed vowel phone in the stressed syllable of the word. As yet another example, the explanatory variables can also include, additionally or alternatively, the distances to the level 4 breaks that immediately precede and follow the stressed vowel phone. These distances can be indicated, for example, by a number of phones. As a further example, the explanatory variables can also include, additionally or alternatively, an identity of the vowel in the stressed syllable. This identity could be indicated in any number of ways. For instance, the vowel in the stressed syllable could be identified by an indicator variable that is represented as an array having an element for each phone that exists within the respective language of the audio recordings. As an example, for American English, the array would have approximately 26 elements, one for each vowel phone within the American English language. Each of these elements could be assigned a value of '0' or '1,' where a '1' identifies the vowel phone of the stressed syllable and all other phones are set to '0.' It will be appreciated that this is merely meant to be an example of a possible mechanism for identifying the vowel phone of the stressed syllable and that there are a multitude of other mechanisms that could be utilized for identifying the vowel of the stressed syllable. In a similar manner, the explanatory variables can also include, additionally or alternatively, an identity of the vowel in the last syllable of the word. As a final example, these explanatory variables can also include the average pitch for a predetermined duration before and after the emphasized word. Such a predetermined duration could be any suitable duration (e.g., 50 milliseconds). The average pitch can be represented in semitones or any other suitable measurement. This contextual and lexical information can be identified via the labels of the training data set 102. It will be appreciated that these are merely meant to be examples of possible explanatory variables and that other explanatory variables can be included without departing from the scope of this disclosure.

The regression function represented by '$F_p(\cdot)$' can be determined through a regression analysis of the above discussed pitch parameters and explanatory variables. Any suitable regression analysis can be utilized including, but not limited to linear regression (e.g., linear regression with least square criterion), regression tree (e.g., regression tree implemented by MATLAB® available from MathWorks, Inc. of Natick, Mass.), any other suitable regression analysis, or any combinations thereof. The resulting regression function '$F_p(\cdot)$' can be viewed as modeling a relationship from a given set of values for the above discussed explanatory variables to predicted values for the above discussed pitch parameters. Consequently, given a set of values for the above described explanatory variables, the function '$F_p(\cdot)$' can produce values for pitch parameters. As such, the resulting regression function '$F_p(\cdot)$' can be viewed as pitch model 116.

In some embodiments, and as depicted, emphasis training engine 104 also includes duration model generator 108. Duration model generator 108 is configured to utilize training data set 102 to generate duration model 118. In embodiments, duration model generator 108 is configured to utilize regression analysis, such as that described above in reference to pitch model generator 106, of training data set 102 to generate duration model 118.

In some embodiments, duration model generator 118 can be configured to generate duration model 118 in accordance with the following equation:

$$y_d^{ik} = F_d(x_d^{ik}) + e_d^{ik}. \quad \text{Equation 2}$$

In equation 2, superscript 'ik' denotes the k-th vowel phone in the i-th emphasized word in the training data set 102; '$y_d^{ik}$' represents a column vector of duration parameters (i.e., the dependent variables); '$x_d^{ik}$' represents a column vector of contextual and lexical information (i.e., the independent variables); '$F_d(\cdot)$' is a regression function; '$e_d^{ik}$' is a residual, or error, term accounting for impact of unknown factors as well as inaccuracy in the form of the regression function, and the subscript 'd' refers to duration. It will be appreciated that equation 2, for generating duration model 118, is built on each vowel phone of the emphasized word, unlike equation 1, which is based on the emphasized word as a whole.

The column vector of duration parameters represented by $y_d^{ik}$ in equation 2 can generally be referred to as dependent variables in regression analysis. The duration parameters can be selected to approximate a tempo of the emphasized word. Such duration parameters can include, for example, a duration (e.g., milliseconds, second, etc.) of each vowel phone of the emphasized word. In some embodiments, this duration could be normalized by taking the duration of a vowel phone in an emphasized word and subtracting a universal mean duration of that vowel phone, and then dividing by the universal standard deviation of duration for that vowel phone. As used in this context, the universal mean duration and the universal standard deviation of duration for a vowel phone can be generated through an analysis of that vowel phone in the entirety of training data set 102. As with the pitch parameters, these duration parameters can be identified, at least in part, via the labels of the training data set 102.

The column vector of contextual and lexical information represented by '$x_d^{ik}$' in equation 2 can generally be referred to as independent variables, or explanatory variables, in regression analysis. These explanatory variables can include, for example, break levels of the breaks immediately preceding the emphasized word and/or immediately following the emphasized word. As another example, these explanatory variables can include, additionally or alternatively, the distance between the current vowel phone and the stressed vowel phone (e.g., in number of phones). As another example, these explanatory variables can include, additionally or alternatively, the number of phones that occur between the current vowel phone and the start and/or end of the emphasized word. As yet another example, the explanatory variables can include, additionally or alternatively, the distances to the level 4 breaks that immediately precede and follow the stressed vowel phone. These distances can be indicated, for example, by a number of phones. As a further example, the explanatory variables can also include, additionally or alternatively, an identity of the current phone. This identity could be indicated in any number of ways, including the indicator variable discussed above, or any other suitable identifier. In a similar manner, the explanatory variables can also include, additionally or alternatively, an identity of the immediately preceding and immediately following phone of the current phone. Because these phone identities are not limited to vowel phones, it will be appreciated, that an indicator variable for such phone identification would include approximately 50 elements, one for each phone within the American English Language. As a final example, these explanatory variables can also include the average phone duration for a predetermined period of time before and after the current phone. Such a predetermined duration could be any suitable duration (e.g., 1 second). In some embodiments, this average phone duration could be normalized by taking the duration of a vowel phone that falls within the predetermined period of time and subtracting a universal mean duration of that vowel phone, and then dividing by the universal standard deviation of duration for that vowel phone. The universal mean duration for that vowel phone can be determined by taking the mean duration of that vowel phone for all instances of that vowel phone in training data set 102. Likewise, the universal standard deviation of duration for that vowel phone can be determined by determining the standard deviation of duration across all instances of that vowel phone in training data set 102. This contextual and lexical information can be identified via the labels of the training data set 102. It will be appreciated that these are merely meant to be examples of possible explanatory variables and that other explanatory variables can be included without departing from the scope of this disclosure.

The regression function represented by '$F_d(\cdot)$' can be determined through a regression analysis of the above discussed duration parameters and explanatory variables. Any suitable regression analysis can be utilized including, but not limited to linear regression (e.g., linear regression with least square criterion), regression tree (e.g., regression tree implemented by MATLAB® available from MathWorks, Inc. of Natick, Mass.), any other suitable regression analysis, or any combinations thereof. The resulting regression function '$F_d(\cdot)$' can be viewed as modeling a relationship from a given set of values for the above discussed explanatory variables to predicted values for duration parameters. Consequently, given a set of values for the above described explanatory variables, the function '$F_d(\cdot)$' can produce values for duration parameters for a given vowel phone of the emphasized word. As such, the resulting regression function '$F_d(\cdot)$' can be viewed as duration model 116.

In some embodiments, and as depicted, emphasis training engine 104 can also include spectral balance model generator 110. Spectral balance model generator 110 is configured to utilize training data set 102 to generate spectral balance model 120. In embodiments, spectral balance model generator 110 is configured to utilize regression analysis, such as that described above in reference to pitch model generator 106, of training data set 102 to generate spectral balance model 120.

When trying to emphasize a word, a speaker tends to increase the vocal effort to produce the word. This increased vocal effort typically leads to a flattening of the spectrum of that word. Generally speech spectrum is a low pass spectrum. That is to say, the higher the frequency of the speech, the lower the energy of the speech. To put it another way, energy of the speech decays as the frequency of the speech increases. Flattening of the speech spectrum reduces this decay, so less decay occurs as the frequency of the speech rises. The spectral balance model is intended to capture this flattening of the spectrum.

In embodiments, spectral balance model generator 110 can be configured to generate spectral balance model 120 in accordance with the following equation:

$$y_s^{ik} = F_s(x_s^{ik}) + e_s^{ik}. \qquad \text{Equation 3}$$

In equation 3, superscript 'ik' denotes the k-th vowel in the i-th emphasized word in the training data set 102; '$y_s^{ik}$' represents a column vector of spectral balance parameters (i.e., the dependent variables); '$x_s^{ik}$' represents a column vector of contextual and lexical information (i.e., the independent variables); '$F_s(\cdot)$' is a regression function; '$e_s^{ik}$' is a residual, or error, term accounting for impact of unknown factors as well as inaccuracy in the form of the regression function, and the subscript 's' refers to spectral balance. It will be appreciated that equation 3 for generating spectral balance model 120, as with equation 2, is built on each vowel phone of the emphasized word, unlike equation 1 which is based on the emphasized word as a whole.

The column vector of spectral balance parameters represented by $y_s^{ik}$ in equation 3 can generally be referred to as dependent variables in regression analysis. In order to capture the flattening of the spectrum that occurs during the emphasis of a word, the spectral balance parameters can include the average energy across various frequency bands within portions of the emphasized word. The average energy for each of these various frequency bands can be measured in decibels, or any other suitable measure. In some embodiments, the average energy could be measured for various frequency bands across each vowel phone. As an example, in some embodiments, the average energy across each vowel phone can be measured for five different frequency ranges: 0-0.5 kHz (kilohertz), 0.5-1 kHz, 1-2 kHz, 2-4 kHz, 4-8 kHz. It will be appreciated that these frequency ranges are merely meant to be illustrative and are not intended to be limiting of this disclosure. Any quantity of frequency bands, and ranges of frequencies therein, is expressly contemplated by this disclosure. These spectral balance parameters can be identified, at least in part, via the labels of the training data set 102.

The column vector of contextual and lexical information represented by '$x_s^{ik}$' in equation 3 can generally be referred to as independent variables, or explanatory variables, in regression analysis. These explanatory variables can include, for example, break levels of the breaks immediately preceding the emphasized word and/or immediately following the emphasized word. As another example, these explanatory variables can include, additionally or alternatively, the distance between the current vowel phone and the stressed vowel phone (e.g., in number of phones). As another example, these explanatory variables can include, additionally or alternatively, the number of phones that occur between the current vowel phone and the start and/or end of the emphasized word. As yet another example, the explanatory variables can include, additionally or alternatively, the distances to the level 4 break that immediately precede and/or follow the stressed vowel phone. These distances can be indicated, for example, by a number of phones. As a further example, the explanatory variables can also include, additionally or alternatively, an identity of the current phone. This identity could be indicated in any number of ways, including the indicator variable discussed above, or any other suitable identifier. In a similar manner, the explanatory variables can also include, additionally or alternatively, an identity of the immediately preceding and/or immediately following phone of the current phone. As a final example, these explanatory variables can also include the average energy in each of the selected frequency bands for a predetermined period of time (e.g., 1 second) before and/or after the current vowel phone. This contextual and lexical information can be identified, at least in part, via the labels of the training data set 102. It will be appreciated that these are merely meant to be examples of possible explanatory variables and that other explanatory variables can be included without departing from the scope of this disclosure.

The regression function represented by '$F_s(\cdot)$' can be determined through a regression analysis of the above discussed spectral balance parameters and explanatory variables. Any suitable regression analysis can be utilized including, but not limited to linear regression (e.g., linear regression with least square criterion), regression tree (e.g., regression tree implemented by MATLAB® available from MathWorks, Inc. of Natick, Mass.), any other suitable regression analysis, or any combinations thereof. The resulting regression function '$F_s(\cdot)$' can be viewed as modeling a relationship from a given set of values for the above discussed explanatory variables to determined values for spectral balance parameters. Consequently, given a set of values for the above described explanatory variables, the function '$F_s(\cdot)$' can produce values for spectral balance parameters for a given vowel phone of the emphasized word. As such, the resulting regression function '$F_s(\cdot)$' can be viewed as spectral balance model 120.

Traditional linguistic labeling frameworks (e.g., the AM framework) treat pitch accent, or emphasis, as binary, categorical, or qualitative, while in fact, emphasis varies in a continuum of degrees. As used in this context, a pitch accent that is treated as binary is treated as either having a pitch accent or not (i.e., only two options). A pitch accent that is categorical can be classified into types, such as those discussed above in reference to ToBI. A pitch accent that is qualitiative merely indicates that one word is more accented than another, but does not quantify the difference. As such, it may be desirable, in some embodiments, to not only enable a user to automatically emphasize an unemphasized, or improperly emphasized, word but to also allow a user to tune a degree of emphasis of the emphasized word. To accomplish this, a model for degree of emphasis to help the user customize the degree of emphasis to the user's taste is needed. Modeling the degree of emphasis is a challenge, however, because it is not labeled in any available dataset. In addition, applying a label for degree of emphasis would be labor intensive and ill-defined because there isn't an objective metric for degree of emphasis.

In generating each of the models described above for pitch, duration, and spectral balance, regression analysis is utilized to learn the mapping between the explanatory variables (i.e., $x_p^i$, $x_d^{ik}$, and $x_s^{ik}$) and the various parameters (i.e., $y_p^i$, $y_d^{ik}$, and $y_s^{ik}$). In each of these mappings a residual or error (i.e., $e_p^i$, $e_d^{ik}$, $e_s^{ik}$) is left over. The degree of emphasis is something that the respective models generally cannot explain and that can generally not be explained by the parameters of the explanatory variables. As a result, the degree of emphasis lies in the unknown factors of the residual. Degree of emphasis model generator 112 is configured to generate a degree of emphasis model 122 from the unknown factors as described in detail below.

For the degree of emphasis model generator 112 to capture the residual for each of the models, each of the models is first generated as described above utilizing training data set 102. These models are then utilized to predict the various parameters (i.e., $y_p^i$, $y_d^{ik}$, and $y_s^{ik}$) utilizing values for the respective explanatory variables (i.e., $x_p^i$, $x_d^{ik}$, and $x_s^{ik}$) of emphasized words within the training data set 102. The resulting predicted parameters for these emphasized words are then subtracted from the actual parameters of the emphasized words gleaned from the training data set 102 which leaves the residual.

It follows from the reasoning above that the residual can be decomposed into two parts: one part can be attributed to the degree of emphasis, and the other part can be attributed to other unknown factors. As a result, the residual for each of the pitch model 116, duration model 118, spectral model 120 can be represented as:

$$e_p^i = \beta_p z^i + \epsilon_p^i \qquad \text{Equation 4}$$

$$e_d^{ik} = \beta_d z^i + \epsilon_d^{ik} \qquad \text{Equation 5}$$

$$e_s^{ik} = \beta_s z^i + \epsilon_s^{ik} \qquad \text{Equation 6}$$

where superscript 'i' denotes the emphasized word in the training data set 102, 'ik' denotes the k-th vowel in the i-th emphasized word in the training data set 102, 'e' represents the residual, 'z' is the degree of emphasis, 'β' is a coefficient of degree of emphasis, 'ϵ' is other unknown factors, and the subscripts 'p', 'd,' and 's' refers to pitch, duration, and spectral balance, respectively. It should be noted that for the same emphasized word, the degree of emphasis is the same across the different aspects of prosody, and in different vowels, of the same emphasized word. It is somewhat intuitive that the degree of emphasis influencing the different aspects of prosody would be the same. There is not a separate degree of emphasis for pitch, duration, or spectral balance.

While the pitch residual is defined on the basis of the emphasized word as a whole, the duration and spectral balance residuals are defined for each vowel phone within the emphasized word. As a result, the range between these residual equations is different, which makes it difficult to calculate the degree of emphasis. To get each of these residual equations in the same range (i.e., word range), we average the residual of the duration and the residual of the spectral balance for each vowel phone across each word. This can be represented as follows:

$$\bar{e}_d^i = \frac{1}{K_i} \sum_{k=1}^{K_i} e_d^{ik} \qquad \text{Equation 7}$$

-continued $$\bar{e}_s^i = \frac{1}{K_i}\sum_{k=1}^{K_i} e_s^{ik} \qquad \text{Equation 8}$$

where 'K' denotes the number of vowel phones in emphasized word 'i.' Similarly, the other unknown factors represented by also need to be converted into this same range. This can be represented as follows:

$$\bar{\varepsilon}_d^i = \frac{1}{K_i}\sum_{k=1}^{K_i} \varepsilon_d^{ik} \qquad \text{Equation 9}$$

$$\bar{\varepsilon}_s^i = \frac{1}{K_i}\sum_{k=1}^{K_i} \varepsilon_s^{ik} \qquad \text{Equation 10}$$

where 'K' again denotes the number of vowel phones in emphasized word i. Once the residual of the duration and the residual of the spectral balance are in the same range, these can be substituted back into equations 5 and 6, respectively, producing the following:

$$\bar{e}_d^i = \beta_d z^i + \bar{\varepsilon}_d^i \qquad \text{Equation 11}$$

$$\bar{e}_s^i = \beta_s z^i + \bar{\varepsilon}_s^i \qquad \text{Equation 12}$$

The residual of equation 4 (i.e., $\epsilon_p^i$), and the average residual of equations 11 and 12 (i.e., $\bar{e}_d^i$ and $\bar{e}_s^i$, respectively) can then be extracted into a matrix as follows:

$$E = \begin{bmatrix} e_p^1 & e_p^2 & \ldots & e_p^I \\ \bar{e}_d^1 & \bar{e}_d^2 & \ldots & \bar{e}_d^I \\ \bar{e}_s^1 & \bar{e}_s^2 & \ldots & \bar{e}_s^I \end{bmatrix} \qquad \text{Equation 13}$$

where 'I' denotes the total number of emphasized words in training data set 102. As can be seen in equation 13, each row represents residual for each prosody parameter (i.e., pitch, duration, and spectral balance) while each column represents the residuals for each emphasized word within training data set 102. The coefficient of degree of emphasis, 'β' can be extracted into a super vector and the degree of emphasis, 'z,' into another super vector, as follows:

$$\beta = \begin{bmatrix} \beta_p \\ \beta_d \\ \beta_s \end{bmatrix} \qquad \text{Equation 14}$$

$$z = \begin{bmatrix} z^1 \\ z^2 \\ \vdots \\ z^I \end{bmatrix} \qquad \text{Equation 15}$$

The other unknown factors for pitch of equation 4 (i.e., $\epsilon_p$) and the average of the other unknown factors for duration and spectral balance of equations 11 and 12 (i.e., $\bar{\varepsilon}_d^i$ and $\bar{\varepsilon}_s^i$, respectively) can then be extracted into another matrix as follows:

$$R = \begin{bmatrix} \varepsilon_p^1 & \varepsilon_p^2 & \ldots & \varepsilon_p^I \\ \bar{\varepsilon}_d^1 & \bar{\varepsilon}_d^2 & \ldots & \bar{\varepsilon}_d^I \\ \bar{\varepsilon}_s^1 & \bar{\varepsilon}_s^2 & \ldots & \bar{\varepsilon}_s^I \end{bmatrix} \qquad \text{Equation 16}$$

Figure 5:
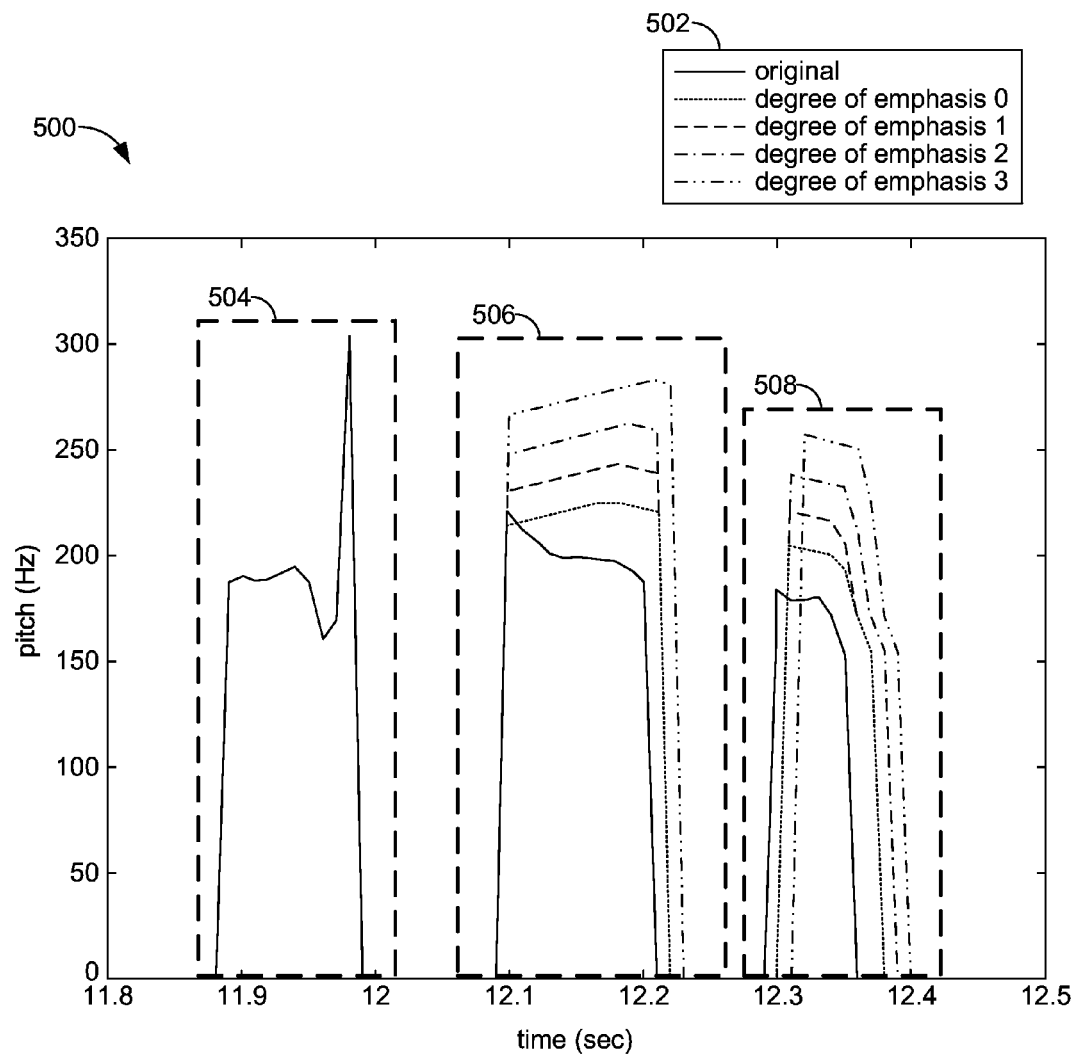
FIG. 5 depicts a graph of an example modified pitch contour, in accordance with various embodiments of the present disclosure.

The matrix form of equations 4, 11, and 12 can then be represented as:

$$E = \beta z^T + R \qquad \text{Equation 17}$$

where superscript 'T' is understood in linear algebra to reference the transpose of a matrix. Applying a mean-squared scheme to equation 17 yields the following equation:

$$\hat{\beta}, \hat{z} = \mathrm{argmin}\|R\|_F = \mathrm{argmin}\|E - \beta z^T\|_F \qquad \text{Equation 18}$$

where $\|\cdot\|_F$ represents the Frobenius norm and 'argmin' represents the argument of the minimum concept in mathematics. This leads to a rank-1 approximation problem, which can be solved using singular vector decomposition (SVD), where $\hat{\beta}$, $\hat{z}$ are singular vectors corresponding to the largest singular value of E, and $\hat{z}$ is normalized such that the variance of its elements is 1. Accordingly, $\hat{\beta}$ is scaled such that its outer product with $\hat{z}$ remains unchanged. The combination of β and z can be considered the degree of emphasis model, which when applied to any of the above discussed predictive models can cause a degree of emphasis change to the respective predictive models. For example, and as depicted in FIG. 5, as the degree of emphasis increases a corresponding increase in pitch and/or duration also occurs. In addition, a further flattening of the spectral balance may be noted as the degree of emphasis increases.

While predictive models 116-120 are discussed above as the being generated in combination, it will be appreciated that this is merely for ease of description and depiction. Any of predictive models 116-120 can be generated by emphasis training engine 104 individually, or in any combination, without departing from the scope of this invention. In such embodiments, it will be appreciated that the respective model generator for any predictive models that are not generated by emphasis training engine 104 may be omitted from emphasis training engine 104. For example, in some embodiments, only pitch model 116 is generated by emphasis training engine 104. In such an example, emphasis training engine 104 could include only pitch model generator 106 and could omit the other model generators 108-110. It will also be appreciated that, in some embodiments, the degree of emphasis model 122 may not be desired. In such embodiments, emphasis training engine 104 could exclude degree of emphasis model generator 112.

Figure 2:
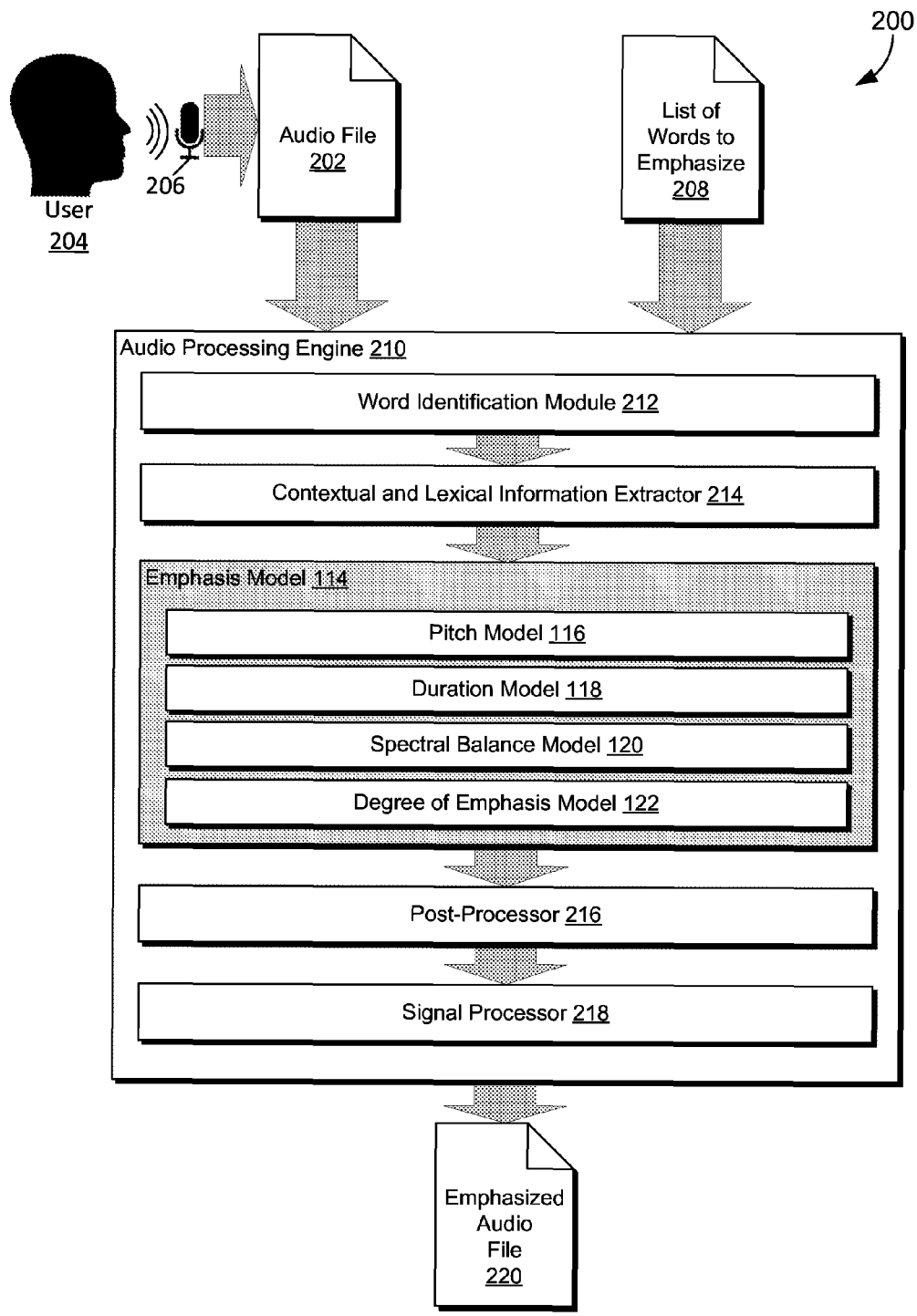
FIG. 2 depicts aspects of an illustrative audio processing system, in accordance with various embodiments of the present disclosure.

FIG. 2 depicts aspects of an illustrative audio processing system 200 in accordance with various embodiments of the present disclosure. Audio processing system 200 includes audio processing engine 210 that is configured to take audio file 202 as input. Audio file 202 is an audio file containing a digital representation of spoken words, such as, for example, voice-over, narration, or any other spoken content. Such spoken words could be produced by user 204. Audio file 202 can take the form of any suitable digital format, such as, for example, a Waveform Audio File Format (WAV), Windows Media Audio (WMA), or MPEG Audio Layer III (MP3). In some embodiments, audio file 202 can be produced, or captured, by an audio capture device, such as, for example, microphone 206.

Audio processing engine 210 can, in some embodiments, also optionally be configured to take as input a list of words to emphasize 208. This list of words to emphasize 208 can be provided by user 204 and can identify words within the audio file 202 that the user 204 wishes to have emphasized. The list of words to be emphasized 208 can be provided in a textual format, an audio format, or any other suitable format. As an example, user 204 could listen to audio file 202 and identify words that were either not emphasized, or not emphasized to the user's satisfaction. The user 204 could then generate a text file listing these words that the user 204 identified. Such a text file could be produced utilizing any conventional text editor or word processor. As another example, the user 204 could listen to audio file 202 and identify words that were either not emphasized, or not emphasized to the user's satisfaction, and either extract these words into a separate audio file as the list of words to emphasize or user 204 could re-record these words (e.g., through dictation) to produce the list of words to emphasize. It will be appreciated that user 204 need not actually listen to audio file 202 to identify those words the user would like to have emphasized. This identification could just as easily occur by the user 204 referring to a script of the spoken words, remembering words that the user 204 spoke, or otherwise identifying words that the user 204 would like to have emphasized. In some embodiments, the list of words to emphasize 208 may not be necessary for the user to identify the words that the user 204 would like to have emphasized. In such embodiments, the user may be able to identify the words by adding tags, or metadata, to the audio file 202 to identify words that the user would like to have emphasized. In such embodiments, it will be appreciated that list of words to emphasize 208 can be omitted.

The audio file 202 and the optional list of words to emphasize 208 can initially be processed by word identification module 212. Word identification module 212 can be configured to identify spoken words within audio file 202 utilizing the list of words to emphasize 208. This can be accomplished in any number of ways. For example, where the list of words to emphasize is a text document, the word identification module 212 can be configured to utilize any suitable natural language processing methods to identify the spoken words within audio file 202 that correspond with words listed within the list of words to emphasize 208. In embodiments where the list of words to emphasize is in the form of an audio recording, a basic comparison, between the words within audio file 202 and the list of words to emphasize 208, can be performed to identify words within audio file 202 that correspond with words recorded within the list of words to emphasize 208. In embodiments where the list of words to emphasize 208 is omitted and, tags (e.g., metadata) within the audio file 202 are utilized to identify the words to be emphasized, the word identification module 212 can be configured to identify words to be emphasized based on the location of the tags within audio file 202. It will be appreciated that these mechanisms for identifying words to be emphasized within audio file 202 are merely meant to be illustrative of possible mechanisms. Any suitable mechanism that can be utilized for identifying words to be emphasized within audio file 202 can be utilized without departing from the scope of this disclosure.

Once the words that are to be emphasized within audio file 202 have been identified, word identification module 212 can be configured to associate a respective location within audio file 202 with each of the identified words to be emphasized. Such a location can take any suitable format. For example, the location of each identified word to be emphasized within audio file 202 can be designated by a number indicating the sequential location of each identified word with respect to the other words within audio file 202. As another example, the location of each identified word could be identified by an amount of time (e.g., milliseconds, seconds, etc.) that elapses in the audio recording prior to the onset, or beginning, of the identified word. It will be appreciated that these mechanisms for identifying a location of the words to be emphasized within audio file 202 are merely meant to be illustrative of possible mechanisms. Any suitable mechanism that can be utilized for identifying a location of the words to be emphasized within audio file 202 can be utilized without departing from the scope of this disclosure.

The locations of the words to be emphasized within audio file 202 can be passed to contextual and lexical information extractor 214, hereinafter merely referred to as information extractor 214 for ease of reference. Information extractor 214 can be configured to extract any lexical or contextual information concerning each of the identified words to be emphasized. This contextual and lexical information can correspond with any of the contextual and lexical information discussed above in reference to explanatory variables, $x_p^i$, $x_d^{ik}$, and $x_s^{ik}$. As such, this extracted contextual and lexical information can be represented by $x_p^j$, $x_d^{jk}$, and $x_s^{jk}$, where j indicates the word being emphasized. This contextual and lexical information can be extracted in any typical manner. For example, any pitch extractor such as, for example, GetF0, Yin's algorithm, etc. For phonetic transcription and alignment, any suitable speech recognition system can be utilized that is capable of transcribing an audio file into phonetic strings and generating a set of time stamps indicative of these phonetic strings starting and ending time. For determining break levels, any suitable break level estimation mechanism can be utilized. In instances where a complete text script of what the speaker has said is available, the punctuation within the script can be utilized to deduce the break levels (e.g., question mark would equate to level 4 break, comma would equate to level 3 break, no punctuation would equate to a level 1 break, etc.). In other embodiments, the break level can be inferred directly from the audio file using existing prosody estimation systems, such as AuToBI.

Once the contextual and lexical information for each word has been extracted, the contextual and lexical information can be passed to emphasis model 114. It is noted that emphasis model 114 of FIG. 2 corresponds with emphasis model 114 of FIG. 1. As such, emphasis model 114 includes pitch model 116, duration model 118, spectral balance model 120, and degree of emphasis model 122. While emphasis model 114 is depicted as including each of models 116-122, it will be appreciated that this is merely for ease of discussion and that emphasis model 114 could, in other embodiments, include any one or more of these models. Utilizing the contextual and lexical information extracted by information extractor 214 in conjunction with models 116-120, respectively, yields the following:

$$\hat{y}_p^j = F_p(x_p^j) \qquad \text{Equation 19}$$

$$\hat{y}_d^{jk} = F_d(x_d^{jk}) \qquad \text{Equation 20}$$

$$\hat{y}_s^{jk} = F_s(x_s^{jk}). \qquad \text{Equation 21}$$

As depicted in equations 19-21, $\hat{y}_p^j$, $\hat{y}_d^{jk}$, and $\hat{y}_s^{jk}$ represent predicted parameters for pitch, duration, and spectral balance, respectively. These predicted parameters were predicted utilizing the regression functions $F_p(\cdot)$, $F_d(\cdot)$, and $F_s(\cdot)$ which were generated in FIG. 1, in conjunction with $x_p^j$, $x_d^{jk}$, and $x_s^{jk}$ and extracted by information extractor 214. While the predicted duration parameters, $\hat{y}_d^{jk}$, and predicted spectral balance parameters, $\hat{y}_s^{jk}$, can completely define the correct duration and spectral balance, respectively, for the word being emphasized, the predicted pitch parameters, $\hat{y}_p^j$, may be insufficient to uniquely define the correct pitch contour of the word to be emphasized. As such linear interpolation (e.g., in semitones) can be used in conjunction with the predicted pitch parameters (pitch starting level, peak pitch level, and pitch ending level) to reconstruct the pitch contour for the word being emphasized. This can be accomplished, for example, by post-processor 216, once post-processing of the predicted pitch parameters has been completed.

As mentioned previously, traditional linguistic labeling frameworks (e.g., the AM framework) treat pitch accent, or emphasis, as binary, categorical, or qualitative, while in fact, emphasis varies in a continuum of degrees. As such, in some embodiments, it may be desirable to not only enable a user to automatically emphasize an un-emphasized, or improperly emphasized, word but to also allow a user to tune a degree of emphasis of the emphasized word. In such embodiments, audio processing engine 210 can also optionally take in a degree of emphasis value designated by a user. In such embodiments, if a degree of emphasis value is not designated by the user, then a predefined default value may be selected by audio processing engine. Such a degree of emphasis can be applied utilizing the degree of emphasis model 122 in conjunction with equations 19-21 to yield:

$$\hat{y}_p^j = F_p(x_p^j) + \hat{\beta}_p z^j \qquad \text{Equation 22}$$

$$\hat{y}_d^{jk} = F_d(x_d^{jk}) + \hat{\beta}_d z^j \qquad \text{Equation 23}$$

$$\hat{y}_s^{jk} = F_s(x_s^{jk}) + \hat{\beta}_s z^j \qquad \text{Equation 24}$$

where $z^j$ is either set to the selected default value or the user defined value to enable the user to tune the degree of emphasis of the emphasized word.

Once the predicted parameters for pitch, duration, and spectral balance are determined in accordance with equations 19-21 or equations 22-24, these parameters may be passed to post-processor 216. Post-processor 216 can be configured to compare the predicted parameters of the word being emphasized against the original parameters of the word being emphasized. In some instances, if the predicted parameters are within a predefined threshold of difference from the original parameters, then the word being emphasized was originally emphasized in accordance with emphasis model 114. In such instances, post-processor 216 can discard the predicted parameters and leave the word being emphasized as is. In addition, post-processor 216 can be configured to ensure the predicted parameters satisfy certain criteria to reduce the chance of poor prediction due to over-fitting and/or extreme situations. If any of the predicted parameters do not satisfy the criteria enforced by post processor 216, the original parameters of the word being emphasized can be utilized instead or the predicted parameters can be modified to satisfy the criteria.

These criteria could include, for example, determining whether the predicted pitch contour is lower than the original pitch contour of the word being emphasized. If so, then the original pitch parameters can be utilized in place of the predicted pitch parameters. If not, then the predicted pitch contour can be utilized. As another example, these criteria could include determining whether the predicted peak pitch level occurs outside the temporal boundary of the word being emphasized. If so, the predicted peak pitch level should be adjusted to occur within the temporal boundaries of the word being emphasized. As another example, these criteria could include determining a rate of pitch transition from the pitch ending level, of the preceding word, to the predicted pitch starting level, of the word being emphasized. If this rate of pitch transition is greater than the maximum pitch transition rate of a human (e.g., approximately 2 semitones per 100 milliseconds), then lower the predicted pitch starting level to achieve the maximum pitch transition rate, or less. In a similar vein, these criteria could also include determining a rate of pitch transition from the predicted pitch ending level, of the word being emphasized, to the pitch starting level of the following word. If this rate of pitch transition is greater than the maximum pitch transition rate of a human then raise the predicted pitch ending level to achieve the maximum pitch transition rate, or less. As yet another example, the criteria could include determining the rate of transition from the predicted pitch starting level, of the word being emphasized, to the predicted peak pitch level of the word being emphasized. If the rate of transition is greater than the maximum pitch transition rate of a human, then lower the predicted peak pitch level to achieve the maximum pitch transition rate, or less. Similarly for the predicted pitch peak level to the predicted pitch ending level, in which case the predicted peak pitch level can again be lowered to achieve the maximum pitch transition rate, or less. As yet another example, the criteria could include determining the predicted duration of the word being emphasized. If the predicted duration of the word being emphasized is less than the original duration of the word being emphasized, then set the prediction to the original duration; else go with the predicted duration. As another example, the criteria could include determining the predicted duration of a vowel phone within the word to be emphasized. If this duration is higher than the upper bound (e.g., approximately 3 standard deviations from the original duration of the vowel phone) then set the prediction to this upper bound; else go with the predicted duration. As another example, the criteria could include comparing the predicted energy level of each frequency band with the original energy level of the respective frequency band. If a predicted energy level for one of the frequency bands is lower than the original energy level, then set the energy level of that frequency band to the original energy level. As a final example, the criteria could include determining the predicted energy of a frequency band is greater than an upper bound (e.g., 3 dB) from the original energy level, in which case the predicted energy level could be set the upper bound, or less. It will be appreciated that any of these post-processing examples could be implemented in any combination. In addition, it will be appreciated that the above post-processing criteria are merely meant to illustrate possible post-processing criteria. Any post-processing criteria, or any combination thereof, can be utilized without departing from the scope of this disclosure.

Once the post-processor 216 has completed processing the predicted parameters, these predicted parameters can be passed to signal processor 218, which can be configured to apply the predicted parameters to the word being emphasized within audio file 202 utilizing existing signal processing mechanisms. Because these predicted parameters are being applied to the word being emphasized within audio file 202, the original pronunciation information and the original timbre information of the word being emphasized is preserved. As used in this context timbre, refers to the character or quality of a voice as distinct from its pitch and intensity (e.g., spectral balance). This is as opposed to a synthesized word which would not include such original information, and therefore would sound unnatural. It will be appreciated that the above described process can be repeated for each word that is to be emphasized within audio file 202. Once all of the words being emphasized within audio file 202 have been processed, as described above, then audio processing engine 210 can output the resulting emphasized audio file 220. In addition, it will be appreciated that, in some embodiments, not all of models 116-122 would be utilized. For example, in some embodiments, pitch model 116, alone may be utilized. In other embodiments, any combination of models 116-122 could be utilized.

While discussed above as being utilized in combination, it will be appreciated that predictive models 116-120 can be used individually, or in any combination, without departing from the scope of this invention. In addition, degree of emphasis model 122 can also be used with the other predictive models 116-120 individually, or in any combination, without departing from the scope of this invention. For example, in some embodiments, only pitch model 116 may be utilized to automatically apply emphasis to a word by predicting a pitch contour for the word.

Figure 3:
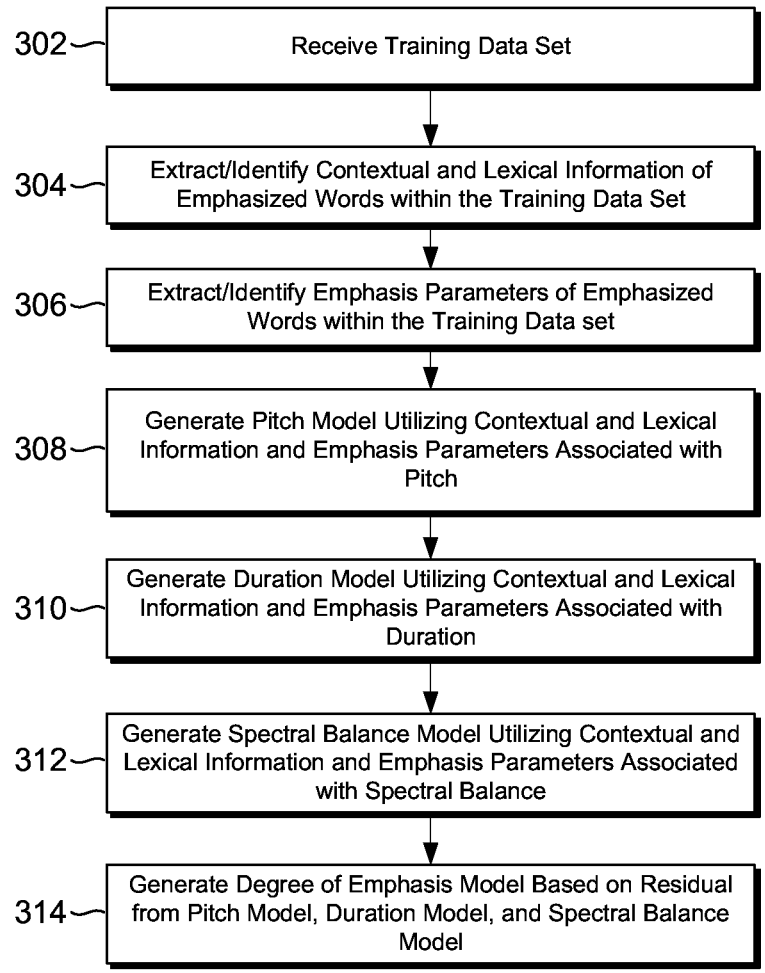
FIG. 3 is an illustrative process flow depicting an example method of generating emphasis models, in accordance with various embodiments of the present disclosure.

FIG. 3 is an illustrative process flow 300 depicting an example method of generating emphasis models, in accordance with various embodiments of the present disclosure. Process flow 300 could be carried out, for example, by emphasis training engine 100 of FIG. 1, and the components thereof. As depicted, process flow 300 can begin at block 302 where a training data set (e.g., training data set 102 of FIG. 1) is received as input. This training data set can include one or more audio files that include audio recordings of words that have been properly emphasized. The audio recordings could be recorded by speakers in a target accent (e.g., American English). In addition, the audio recordings could be in a target genre (e.g., radio broadcasting genre). This training data set can also include labels that identify various information with respect to the audio recordings of the training data set. Examples of such labels are discussed in reference to FIG. 1, above.

At block 304, contextual and lexical information for pitch, duration, and/or spectral balance of the emphasized words can be extracted from the training data set and/or identified via the aforementioned labels. This contextual and lexical information can correspond with any or all of the contextual and lexical information discussed above in reference to explanatory variables, $x_p^i$, $x_d^k$, and $x_s^{ik}$.

At block 306, emphasis parameters for pitch, duration, and/or spectral balance of the emphasized words within the training data set can be extracted from the training data set and/or identified via the aforementioned labels. These emphasis parameters can correspond with any of the emphasis parameters discussed above in reference to dependent variables, $y_p^i$, $y_d^{ik}$, and $y_s^{ik}$.

At block 308, a pitch model (e.g., pitch model 116) is generated utilizing contextual and lexical information for pitch (e.g., $x_p^i$) in conjunction with the emphasis parameters associated with pitch (e.g., $y_p^i$). In embodiments, this can be accomplished utilizing regression analysis, such as that described in reference to pitch model generator 106 of FIG. 1, to correlate the contextual and lexical information for pitch with the emphasis parameters for pitch. Regression analysis can help identify how the emphasis parameters for pitch change with respect to contextual and lexical information for pitch.

At block 310, a duration model (e.g., duration model 118) is generated utilizing contextual and lexical information for duration (e.g., $x_d^{ik}$) in conjunction with the emphasis parameters associated with duration (e.g., $y_d^{ik}$). In embodiments, this can be accomplished utilizing regression analysis, such as that described in reference to duration model generator 108 of FIG. 1, to correlate the contextual and lexical information for duration with the emphasis parameters for duration. Regression analysis can help identify how the emphasis parameters for duration change with respect to contextual and lexical information for duration.

At block 312, a spectral balance model (e.g., spectral balance model 120) is generated utilizing contextual and lexical information for spectral balance (e.g., $x_s^{ik}$) in conjunction with the emphasis parameters associated with duration (e.g. $y_s^{ik}$). In embodiments, this can be accomplished utilizing regression analysis, such as that described in reference to spectral balance model generator 110 of FIG. 1, to correlate the contextual and lexical information for spectral balance with the emphasis parameters for spectral balance. Regression analysis can help identify how the emphasis parameters for spectral balance change with respect to changes in contextual and lexical information for spectral balance.

At block 314, a degree of emphasis model (e.g., degree of emphasis model 122) is generated. This can be accomplished, for example, utilizing the residuals (i.e., $e_p^i$, $e_d^{ik}$, and $e_s^{ik}$) of the regression analysis utilized in generating the pitch model, the duration model, and the spectral balance model in conjunction with singular value decomposition, as discussed extensively in reference to FIG. 1

Figure 4:
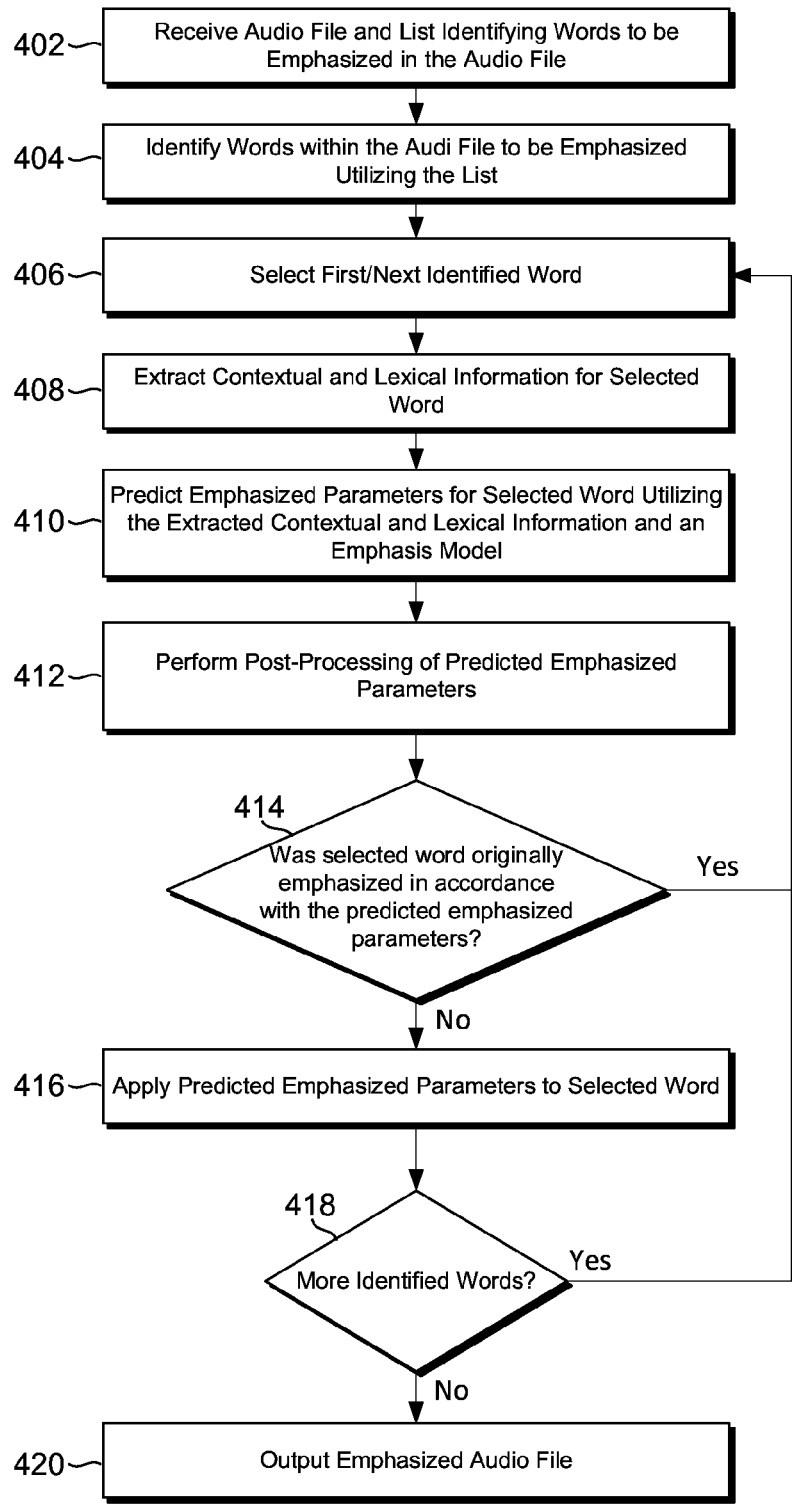
FIG. 4 depicts an illustrative process flow depicting a method of generating an emphasized audio file, in accordance with various embodiments of the present disclosure.

FIG. 4 depicts an illustrative process flow 400 depicting a method of generating an emphasized audio file, in accordance with various embodiments of the present disclosure. Process flow 400 could be carried out, for example by audio processing engine 210 of FIG. 2. As depicted, process flow 400 can begin at block 402 where an audio file (e.g., audio file 202) and a list identifying words to be emphasized within the audio file (e.g., list of words to emphasize 208) are received. This list identifying words to be emphasized can be provided by a user and can identify words within the audio file that the user wishes to have emphasized. The list identifying words to be emphasized can be in a textual format, an audio format, or any other suitable format, as discussed above in reference to FIG. 2. In some embodiments, the words to be emphasized could be identified in a different manner, such as for example, metadata tagging within the audio file. In such embodiments, it will be appreciated that the list identifying words to be emphasized can be omitted.

At block 404, words within the audio file that are to be emphasized can be identified utilizing the list received at block 402. This can be accomplished in any number of ways. For example, where the list identifying words to be emphasized is a text document, any suitable natural language processing methods can be utilized to identify the spoken words within the audio file that correspond with words listed within the list. In embodiments where the list is in the form of an audio recording, a basic comparison between the words within the audio file and the recorded words in the list can be performed to identify the words that are to be emphasized. It will be appreciated that these mechanisms for identifying words to be emphasized within the audio file are merely meant to be illustrative of possible mechanisms. Any suitable mechanism that can be utilized for identifying words to be emphasized within audio file 202 can be utilized without departing from the scope of this disclosure.

Once the words that are to be emphasized within audio file have been identified, we can move to block 406 where we select the first, or next, identified word that is to be emphasized. Once selected, any lexical or contextual information concerning the selected words to be emphasized can be extracted. This contextual and lexical information can correspond with any of the contextual and lexical information discussed above in reference to explanatory variables, $x_p^i$, $x_d^{ik}$, and $x_s^{ik}$.

Once the contextual and lexical information for each word has been extracted, the contextual and lexical information can be utilized, at block 410, to predict emphasized parameters, such as, the pitch parameters, duration parameters, and/or spectral balance parameters discussed elsewhere herein. This can be accomplished utilizing any one or more of the predictive models depicted by equations 19-24, above. In addition, in some embodiments, as discussed above, a degree of emphasis may also be applied to the predicted emphasized parameters. In such embodiments, this could be accomplished in accordance with user input that designates a degree of emphasis to be applied or could be accomplished by applying a default degree of emphasis that could be selected in the absence of such user input.

At block 412, post-processing of the predicted emphasized parameters can be performed to ensure the predicted parameters satisfy certain predetermined criteria. This post-processing can help reduce the chance of poor prediction due to over-fitting and/or extreme situations. If any of the predicted parameters do not satisfy the predetermined criteria then the original parameters of the selected word being emphasized can be utilized instead, or the predicted parameters can be modified to satisfy the criteria. These predetermined criteria can be the same as, or similar to, the criteria discussed in reference to post-processor 216, above.

At block 414 a determination is made as to whether the selected word was originally emphasized in accordance with the predicted emphasis parameters. This can begin by determining whether the word is pitch-accented (e.g., rising to peak pitch level and then falling). This can be accomplished using existing pitch accent detectors, such as, for example, AuToBI. If the word is not pitch accented, then it can be assumed that the word is not emphasized. If the word is pitch accented, then various screening criteria can be applied. This screening criteria can include comparing the original emphasis parameters of the selected word against the predicted emphasis parameters to determine if the original emphasis parameters are within a predefined threshold of difference from the predicted emphasis parameters (e.g., small variance between predicted pitch contour and original pitch contour). If the original emphasis parameters for the selected word are within the predefined threshold of difference, then the selected word was originally emphasized in accordance with the predicted emphasis parameters and the processing returns to 406, where a next identified word is selected. If, on the other hand, the original emphasis parameters for the selected word are not within the predefined threshold of difference, then the selected word was not originally emphasized, or improperly emphasized, and the processing proceeds to block 416. It will be appreciated that in some embodiments, block 414 may be omitted. In such embodiments, processing would proceed directly from block 412 to block 416.

At block 416, the predicted emphasis parameters can be applied to the selected word. This can be accomplished utilizing a signal processor, such as signal processor 218, of FIG. 2. Because these predicted emphasis parameters are being applied to the selected word within the audio recording, the original pronunciation information and the original timbre information of the selected word is preserved. This is as opposed to a synthesized word which would not include this original information.

At block 418, a determination is made as to whether more identified words exist. If this determination is in the affirmative, then the processing can proceed back to block 406, where the next identified word can be selected. If, on the other hand, this determination is in the negative, then the processing can proceed to block 420, where the emphasized audio file can be output.

FIG. 5 depicts a graph 500 of an example modified pitch contour, in accordance with various embodiments of the present disclosure. As depicted the vertical axis of graph 500 represents the pitch in hertz while the horizontal axis represents time in seconds. The depicted blocks 504-508 represent the three syllables from the phrase "that person." As such, block 504 represents "that," block 506 represents "per," and block 508 represents "son." In this example, the word "person" was not originally emphasized, but has been selected to be emphasized. As can be seen, the lowest pitch contour in blocks 506 and 508 represents the original pitch contour. Each of the contours above the original pitch contour have been modified to emphasize the word person. In addition, each higher pitch contour represents a higher degree of emphasis, as indicated by key 502. As can be seen, as the degree of emphasis increases, so too does the pitch contour. In addition, as can be seen, as the degree of emphasis rises the duration of these two syllables also gets longer.

Figure 6:
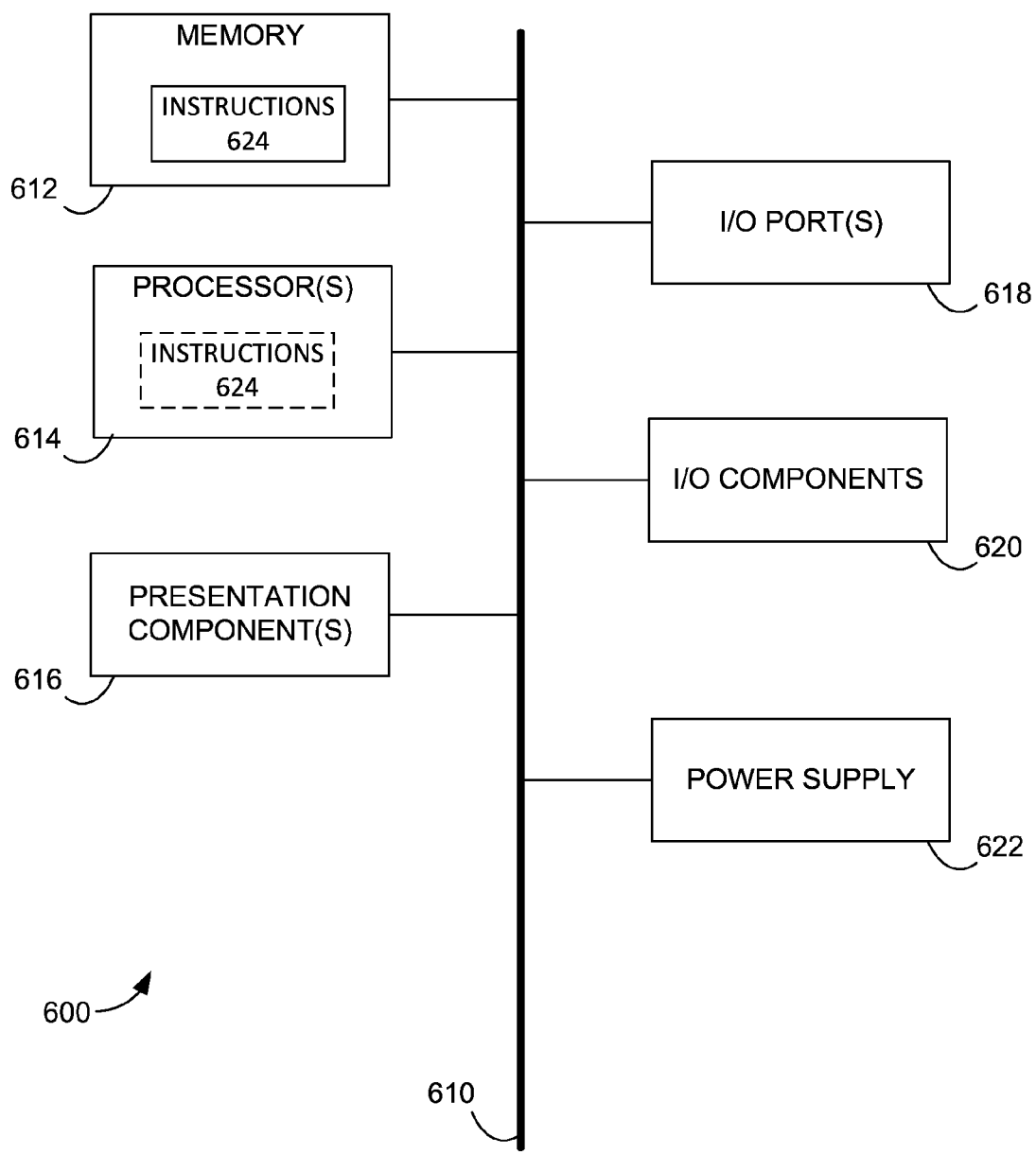
FIG. 6 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 6, an illustrative operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-usable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 6 is merely illustrative of an example computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. As depicted, memory 612 includes instructions 624. Instructions 624, when executed by processor(s) 614 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 600 includes one or more processors that read data from various entities such as memory 612 or I/O components 620. Presentation component(s) 616 present data indications to a user or other device. Illustrative presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable media having a plurality of executable instructions embodied thereon, which, when executed by a processor of a computing device cause the computing device to:
   receive an audio recording of spoken content for audibly emphasizing an identified word with respect to other words included in the spoken content;

extract contextual and lexical information, from the audio recording, relating to the identified word;

determine emphasis parameters based on the contextual and lexical information and a predictive model that correlates the contextual and lexical information with the determined emphasis parameters; and apply the emphasis parameters to modify the identified word such that when modified, the identified word is audibly emphasized within the audio recording of the spoken content and with respect to the other words included in the spoken content.

2. The one or more computer-readable media of claim 1, wherein to apply the emphasis parameters to modify the identified word includes preservation of an original pronunciation of the identified word.

3. The one or more computer-readable media of claim 1, wherein to apply the emphasis parameters to modify the identified word includes preservation of an original timbre of the identified word.

4. The one or more computer-readable media of claim 1, wherein the emphasis parameters include a predicted starting pitch level, a predicted peak pitch level, and a predicted ending pitch level for the identified word.

5. The one or more computer-readable media of claim 1, wherein, to apply the emphasis parameters to modify the identified word, the plurality of executable instructions further cause the processor to calculate a pitch contour based on a starting pitch level, a peak pitch level, and an ending pitch level included in the emphasis parameters.

6. The one or more computer-readable media of claim 1, wherein the contextual and lexical information includes an average pitch for a predetermined duration before and after the identified word.

7. The one or more computer-readable media of claim 1, wherein the emphasis parameters include a predicted duration for each vowel phone of the identified word.

8. The one or more computer-readable media of claim 1, wherein the contextual and lexical information includes an average normalized duration of phones within a predetermined duration before and after each vowel phone of the identified word.

9. The one or more computer-readable media of claim 1, wherein the emphasis parameters include a predicted average energy in a plurality of frequency bands for each vowel phone of the identified word.

10. The one or more computer-readable media of claim 1, wherein the contextual and lexical information includes an average energy in each of a plurality of frequency bands for a predetermined duration before and after each phone of the identified word.

11. The one or more computer-readable media of claim 1, wherein the plurality of executable instructions, when executed by the processor of the computing device further cause the computing device to:

receive input from a user identifying a degree of emphasis to apply when modifying the identified word, wherein to determine the set of emphasis parameters is further based on the identified degree of emphasis.

12. A computer-implemented method to facilitate audibly emphasizing an identified word, the method comprising:

receiving a first audio recording of first spoken content that includes a plurality of audibly emphasized words;

determining contextual and lexical information based on the first spoken content, wherein the contextual and lexical information is associated with each of the plurality of audibly emphasized words;

generating a predictive pitch model by correlating the contextual and lexical information associated with each of the plurality of audibly emphasized words included in the first spoken content with pitch parameters, the pitch parameters including a starting pitch level, a peak pitch level, and an ending pitch level for each of the plurality of audibly emphasized words;

modifying a second audio recording of second spoken content that includes the identified word, by automatically applying emphasis parameters, based on the predictive pitch model, to the second audio recording, such that the identified word is audibly emphasized with respect to other words included in the second spoken content.

13. The computer-implemented method of claim 12, further comprising:

generating a predictive duration model by correlating the contextual and lexical information with duration parameters of each vowel phone of the plurality of emphasized words, the duration parameters including a duration of each vowel phone.

14. The computer-implemented method of claim 12, wherein a duration of each vowel phone of the plurality of emphasized words is normalized.

15. The computer-implemented method of claim 12, further comprising:

generating a predictive spectral balance model by correlating the contextual and lexical information with spectral balance parameters of each of a plurality of vowel phones of the plurality of emphasized words, the spectral balance parameters including an indication of energy within each frequency band of a plurality of frequency bands.

16. The computer-implemented method of claim 12, further comprising:

generating a degree of emphasis model that correlates a degree of emphasis value with a degree of emphasis change to at least one of the predictive pitch model, a predictive duration model, and a predictive spectral balance model, wherein the degree of emphasis model enables a user to adjust a degree of audible emphasis for the identified word included in the spoken content, which is recorded on the second audio recording.

17. The computer implemented method of claim 12, wherein the contextual and lexical information includes at least one of:

an average pitch for a predetermined duration before and after each of the plurality of emphasized words;

an average normalized duration of vowel phones within a predetermined duration before and after each vowel phone within each of the plurality of emphasized words; and an average energy in each of a plurality of frequency bands for a predetermined duration before and after each vowel phone within each of the plurality of emphasized words.

18. A computing device to facilitate a user of the computing system in automatically emphasizing spoken words, the computing device comprising:

one or more processors; and a memory, coupled with the one or more processors, having a plurality of executable instructions embodied thereon, which, when executed by the one or more processors cause the computing device to:

identify, within an audio recording of spoken content, a word to be audibly emphasized, with respect to other words included in the spoken content;

extract contextual and lexical information from the audio recording relating to the identified word;

determine predicted pitch parameters based on the contextual and lexical information and a predictive model that correlates the contextual and lexical information with the predicted pitch parameters, the predicted pitch parameters including a predicted starting pitch level, a predicted peak pitch level, and a predicted ending pitch level for the identified word; and apply the predicted pitch parameters to modify the identified word by calculating a pitch contour based on the predicted starting pitch level, the predicted peak pitch level, and the predicted ending pitch level, such that when modified, the identified word is audibly emphasized with respect to the other words included in the spoken content.

19. The computing device of claim 18, wherein to apply the predicted pitch parameters to modify the identified word includes preservation of an original pronunciation and an original timbre of the identified word.

20. The computing device of claim 18, wherein the contextual and lexical information includes an average pitch for a predetermined duration before and after the identified word.

* * * * *